Patented Dec. 19, 1944

2,365,652

UNITED STATES PATENT OFFICE 2,365,652

CELLULOSE MIXED ESTER MOLDING COMPOSITIONS

Raphael L. Stern, South River, N. J., assignor to Hercules Powder Company, Wilmington, Del., a corporation of Delaware No Drawing. Application November 26, 1941,
Serial No. 420,506

9 Claims. (Cl. 106—181)

This invention relates to an improved cellulose mixed ester plastic and to methods of production thereof. More particularly, it relates to a clear, transparent, substantially colorless cellulose mixed ester plastic and to methods of producing the same. This application is a continuation-in-part of my prior applications Serial Nos. 247,680 filed December 24, 1938, now Patent No. 2,280,863 issued April 28, 1942, and 247,681 filed December 24, 1938, now Patent No. 2,286,041 issued June 9, 1942.

Cellulose mixed ester plastics, as produced commercially, possess an inherent yellow tone which is further increased on heating of the plastic compositions during or prior to molding. To utilize cellulose mixed esters for the production of plastics having substantially no color, attempts have been made to neutralize the yellow tone by addition of a blue dyestuff. Satisfactory results have not been obtained and the resulting plastics have usually been of a brownish muddy tint. It is believed that blue dyestuffs in general are inherently unstable under the conditions of molding and undergo decomposition.

Now, I have found that the yellow tint of cellulose mixed esters may be neutralized with a blue dyestuff and the cellulose mixed esters and blue dyestuff stabilized against discoloration on heating in molding compositions, enabling me to produce clear, transparent and substantially colorless cellulose mixed ester plastics.

I have found that addition of an acid having a dissociation constant within the range of about $4 \times 10^{-2}$ to about $1 \times 10^{-4}$ to the cellulose mixed ester plastic containing the blue dyestuff retards the discoloration of the cellulose mixed esters on heating in the molding operation and also exerts a stabilizing influence on the blue dyestuff, preventing its decomposition during the molding of the plastic.

Although the exact mechanism by which my acids stabilize the dyes is not known to me, the behavior appears to be general for dyestuffs of blue color, for example, blue dyes of the azine, diphenyl naphthyl methane, anthraquinone, or triphenylmethane types.

My process is applicable to any cellulose mixed ester plastic composition such as cellulose acetate-butyrate, acetate-propionate, acetate-caproate, acetate-stearate, containing a heat-stable plasticizer or mixture of heat-stable plasticizers, i. e., plasticizers which do not themselves discolor when heated with cellulose mixed ester under molding compositions. Plasticizers which have been found to be useful in preparing the cellulose mixed ester plastics are camphor, diamyl, dibutyl, dimethyl, diethyl or diphenyl phthalate, ethyl phthalyl ethyl glycollate, tricresyl phosphate, tributyl phosphate, butyl tartrate, ortho and para toluene sulfonamides, tripropionin, triethyl citrate, dimethoxy ethyl phthalate, methyl methoxy-ethyl phthalate, light colored plasticizing resins, etc.

The blue dyes which are suitable for tinting of cellulose mixed ester plastic compositions may be, for example, of the azine, diphenyl naphthyl methane, anthraquinone or triphenylmethane types. The amount of dye added is usually the amount necessary to neutralize the yellow tint. This amount varies with different dyestuffs due to the different tinctorial powers. Blue dyes which are satisfactory for this purpose are:

|  | Type of dye | Soc. Dyers & Colorists England, 1924 ed., Color Index No. |
| --- | --- | --- |
| Phenoform Blue R | Triphenyl methane | (1) |
| Wool Fast Blue | Azine | 833 |
| Victoria Blue B | Diphenyl mono naphthyl methane | 729 |
| Violet FA | Triphenyl methane | 681 |
| Blue GA | Anthraquinone | (1) |

1 Not given.

The acids which I have found to exert a stabilizing effect on the cellulose mixed ester and the blue dye to permit the production of plastic compositions having substantially no color or haze may be either inorganic or organic acids, and may be monobasic, polybasic, or hydroxy in character. I have classified the acids which exert the desired effect as those acids whose dissociation constant falls within the range of about $4 \times 10^{-2}$ to about $1 \times 10^{-4}$. In the case of polybasic acids I classify on the basis of the dissociation constant of the first hydrogen ion. Acids which are particularly effective are phosphoric acid ($K_D$ $1.1 \times 10^{-2}$), tartaric acid ($K_D$ $1.1 \times 10^{-3}$), citric acid ($K_D$ $8 \times 10^{-4}$), oxalic acid ($K_D$ $3.8 \times 10^{-2}$) and lactic acid ($K_D$ $1.38 \times 10^{-4}$).

In accordance with this invention, it has been found that the color stability of cellulose mixed ester molding compositions can be greatly improved by judiciously adding an acid without the use of a dye to the substantially neutral molding composition in an amount which is insufficient to deleteriously affect the stability of the cellulose mixed ester itself.

The exact mechanism by which the acid added improves the color stability of the cellulose mixed ester molding composition is not known. It is believed, however, that the discoloration normally encountered is a result of some degradation or change of certain impurities present in small amount in the cellulose mixed ester as produced commercially. It is further believed that the acid added minimizes or prevents this degradation or change by combining with the impurities to transform them into color stable derivatives probably by providing an environment in which degradation proceeds without affecting color.

Adding the acid just prior to preparation of the plastic avoids long periods of heating of the flake in the presence of acid and air, for instance, if acid were allowed to remain in the ester prior to drying, and thus benefits color stability without promoting excessive breakdown of the cellulose.

The stabilizing effect of the various acids utilizable in accordance with this invention appears to be related to the strength of the acid and the amount used. With the weaker acids the effect is obtained with a larger proportion of the acid. With tartaric acid, for example, best results are obtained when the tartaric acid is present in an amount within the range of about 0.005 to about 0.02% by weight of the cellulose mixed ester. Above 0.05%, by weight, of tartaric acid the color stabilizing effect is minimized. We have obtained the effect with other acids when used in amounts up to about 0.10%, by weight, of the cellulose mixed ester. The effect has been obtained with as little as 0.0005% by weight, of acid based on the cellulose mixed ester.

I find it convenient to add the acid to a solution of a suitable blue dye which is, in turn, incorporated into the cellulose mixed ester plastic. Thus, for example, the acid may be added to a dye solution containing 0.5 gram of blue dye dissolved in a gallon of methyl alcohol. The amount of acid added will fall within the range disclosed above and will depend on the particular acid employed.

In carrying out the process of this invention, I may, for example, make a paste of cellulose mixed ester, plasticizer and solvent in a suitable mixer, roll it into sheets on heated rolls, add the blue dye solution containing the acid stabilizing agent thereto and finally remove most of the solvent by rolling. Further amounts of solvent may be removed by subsequently heating chips of the rolled sheets to an elevated temperature. The plastic composition in granular or powdered form may then be molded in a heated press or may be injection molded. The plastic composition may be used for the production of sheets, rods, tubes or any molded article.

As illustrative of the carrying out of the invention the following examples are typical:

Example 1

A paste was prepared in a chrome plated mixer according to the following formula:

| | |
|---|---|
| Cellulose acetate-butyrate (36% butyryl, 13% acetyl) _____ pounds__ | 10 |
| Dibutyl phthalate_____ ounces__ | 14 |
| Triphenyl phosphate_____ do____ | 14 |
| Acetone _____ pounds__ | 4 |
| Ethyl alcohol_____ do____ | 3 |

Two equal portions of the above mix were taken off and both rolled into sheets on chrome plated rolls. To portion A there was added on the rolls 8.6 cc. of a solution of 0.113 gram of Phenoform Blue R in one liter of methyl alcohol. To portion B there was added 8.6 cc. of a solution of 0.113 gram of Phenoform Blue R in one liter of methyl alcohol containing 8 grams of tartaric acid per liter of dye solution. Rolling was continued until the sheets contained about 10%, by weight, of solvent. Both portions were then cut to granulations of about one-quarter inch size and dried in an oven to less than 2% volatile content. The two portions were then injected into articles in a standard commercial injection molding machine at a cylinder temperature of about 400° F. The granulations prepared from portion A gave molded pieces having a brownish, muddy tint. The granulations from portion B, on the other hand, gave molded articles having a clear, or more blue-violet glass-like tint.

Example 2

A paste was prepared according to the following formula:

| | |
|---|---|
| Cellulose acetate-butyrate_____ grams__ | 100 |
| Diamyl phthalate_____ do____ | 25 |
| Methyl ethyl ketone_____ cc___ | 100 |

Two equal portions of the paste were rolled into sheets. To one portion on the rolls was added 2 cc. of a 1% aqueous solution of tartaric acid. Both portions were cut up and dried in an oven. The two portions were then molded into 2" x ½" discs in a standard compression molding machine. The color of the untreated disc gave a Hazen scale reading of 5 while the acid treated block gave a lighter Hazen scale reading of 3.

What I claim and desire to protect by Letters Patent is:

1. A cellulose mixed ester molding composition prepared by colloiding a cellulose mixed ester normally having a tendency to discolor on heating at molding temperatures with a plasticizer therefor and adding an acid having a dissociation constant within the range of about $4 \times 10^{-2}$ to about $1 \times 10^{-4}$ to the composition in a quantity in the range between about 0.002% and 0.1% by weight of the cellulose mixed ester.

2. A cellulose mixed ester molding composition prepared by colloiding a cellulose mixed ester normally having a tendency to discolor on heating at molding temperatures with a plasticizer therefor and adding oxalic acid to the composition in a quantity in the range between about 0.002% and 0.1% by weight of the cellulose mixed ester.

3. A cellulose mixed ester molding composition prepared by colloiding a cellulose mixed ester normally having a tendency to discolor on heating at molding temperatures with a plasticizer therefor and adding citric acid to the composition in a quantity in the range between about 0.002% and 0.1% by weight of the cellulose mixed ester.

4. A cellulose mixed ester molding composition prepared by colloiding a cellulose mixed ester normally having a tendency to discolor on heating at molding temperatures with a plasticizer therefor and adding tartaric acid to the composition in a quantity in the range between about 0.002% and 0.1% by weight of the cellulose mixed ester.

5. A clear, transparent, substantially colorless plastic composition comprising cellulose mixed ester, a plasticizer, a suitable blue dyestuff and 0.002% to about 0.10% by weight of an acid having a dissociation constant within the range of about $4 \times 10^{-2}$ to about $1 \times 10^{-4}$.

6. A clear, transparent, substantially colorless plastic composition comprising cellulose mixed ester, a plasticizer, a suitable blue dyestuff, and 0.0005 to about 0.10% by weight, of an acid having a dissociation constant within the range of about $4 \times 10^{-2}$ to about $1 \times 10^{-4}$.

7. A clear, transparent, substantially colorless plastic composition comprising cellulose mixed ester, a plasticizer, a suitable blue dyestuff, and 0.0005 to about 0.10% by weight, of oxalic acid.

8. A clear, transparent, substantially colorless plastic composition comprising cellulose mixed ester, a plasticizer, a suitable blue dyestuff, and 0.0005 to about 0.10% by weight, of citric acid.

9. A clear, transparent, substantially colorless plastic composition comprising cellulose mixed ester, a plasticizer, a suitable blue dyestuff, and 0.0005 to about 0.10% by weight, of tartaric acid.

RAPHAEL L. STERN.